United States Patent [19]

Camras

[11] 4,418,365
[45] Nov. 29, 1983

[54] VIDEO DISC TRANSDUCER SYSTEM

[75] Inventor: Marvin Camras, Glencoe, Ill.

[73] Assignee: IIT Research Institute, Chicago, Ill.

[21] Appl. No.: 267,084

[22] Filed: May 26, 1981

Related U.S. Application Data

[63] Continuation of Ser. No. 47,582, Jun. 11, 1979, abandoned, and a continuation-in-part of Ser. No. 519,340, Oct. 30, 1974, abandoned, and Ser. No. 826,054, Aug. 26, 1977, abandoned.

[51] Int. Cl.$^3$ ............................................. H04N 5/85
[52] U.S. Cl. ................... 358/342; 369/111; 369/113; 358/341
[58] Field of Search ............. 360/102; 358/342, 345, 358/341, 348; 369/111, 115, 113, 125, 284

[56] References Cited

U.S. PATENT DOCUMENTS

| | | | |
|---|---|---|---|
| 1,787,919 | 1/1931 | Watson | 358/341 |
| 2,517,797 | 8/1950 | McFarlane | 358/345 |
| 2,972,660 | 2/1961 | Toulon | 358/342 |
| 3,040,124 | 6/1962 | Camras | 358/335 |
| 3,097,262 | 7/1963 | Ehrenhoft | 358/180 |
| 3,198,880 | 8/1965 | Toulon | 358/342 |
| 3,363,054 | 1/1968 | Mason | 358/342 |
| 3,893,185 | 7/1975 | Ring | 360/103 |
| 3,939,302 | 2/1976 | Kihara | 369/111 |
| 3,980,810 | 9/1976 | Tinet | 360/102 |
| 3,980,818 | 9/1976 | Browning | 346/76 L |

Primary Examiner—Alan Faber
Attorney, Agent, or Firm—Hill, Van Santen, Steadman & Simpson

[57] ABSTRACT

An optical transducer system reproduces a videodisk record by rotating the disc at a low speed. A record guiding means is comprised of a ribbed gate region. The ribs engage the disc on opposite margins of the optical images recorded on the disc and extend in a circumferential direction.

7 Claims, 8 Drawing Figures

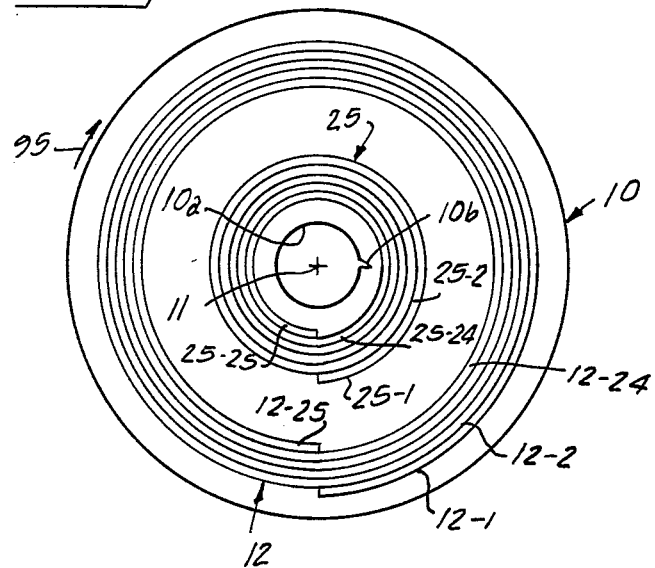
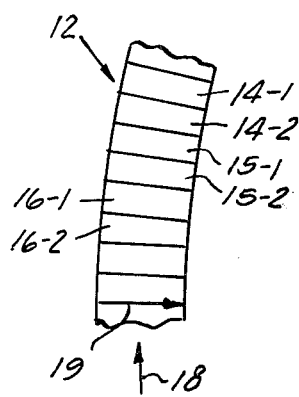
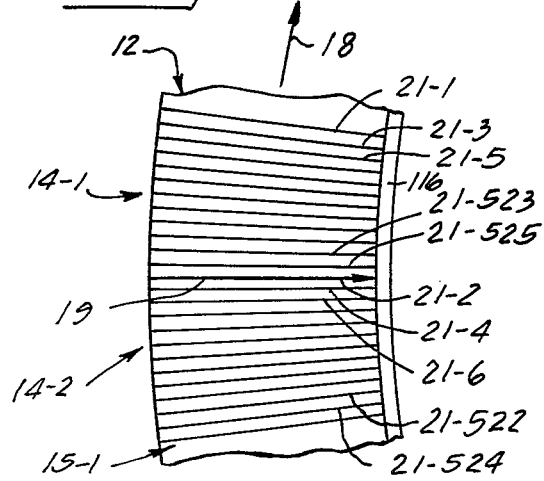
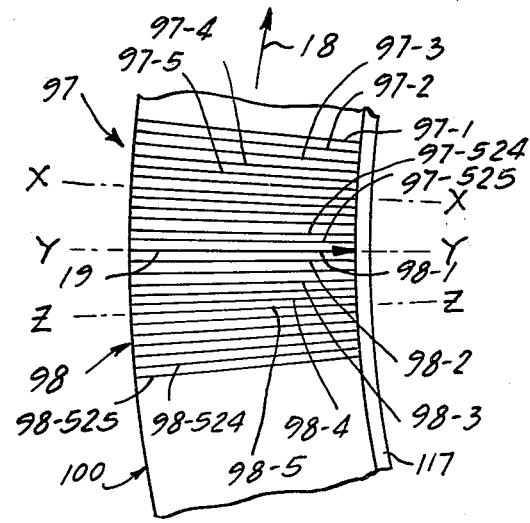
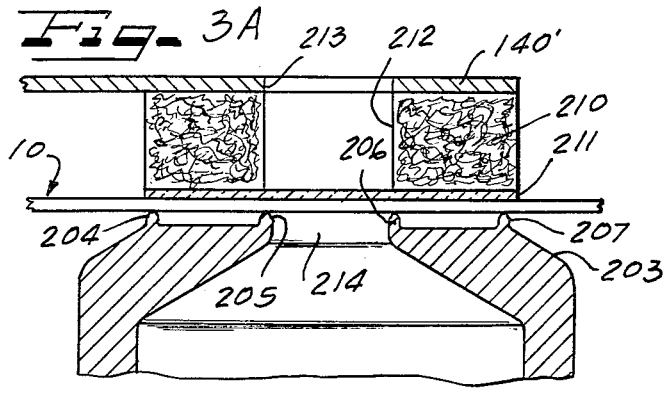
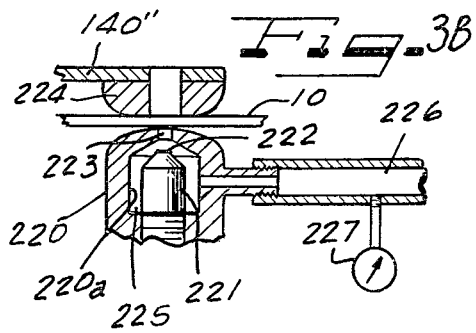

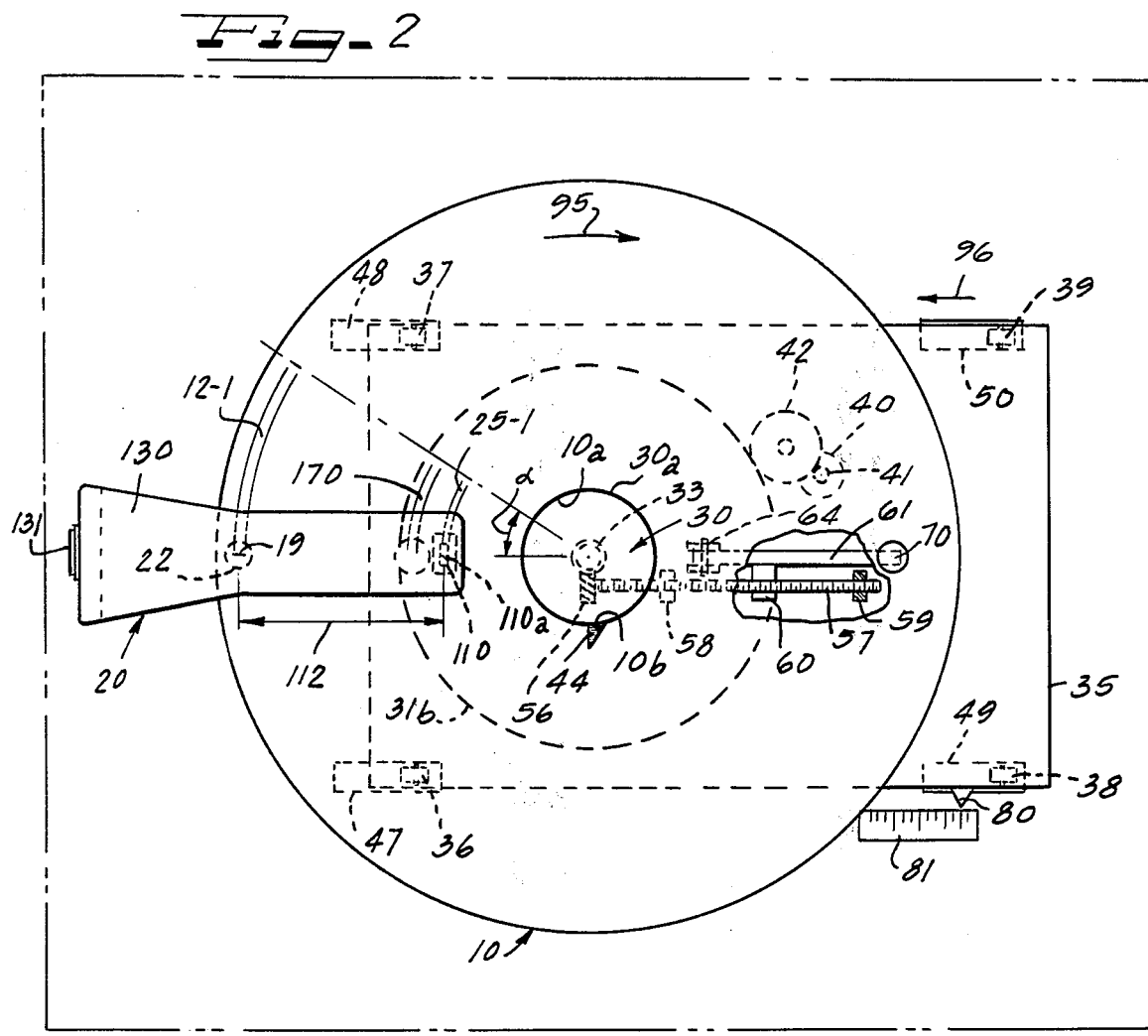
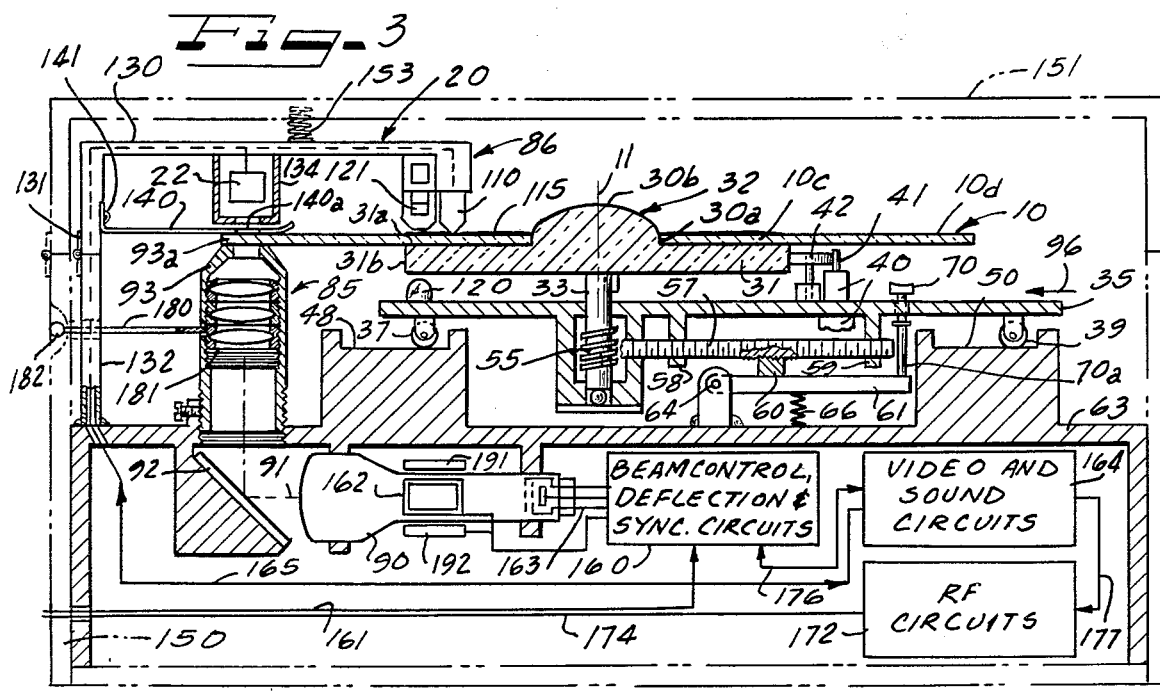

VIDEO DISC TRANSDUCER SYSTEM

CROSS-REFERENCES TO RELATED APPLICATIONS

This is a continuation of application Ser. No. 47,582 filed June 11, 1979 now abandoned.

The present application is also, a continuation in part of my copending application Ser. No. 519,340 filed Oct. 30, 1974, now abandoned, and Ser. No. 826,054 filed Aug. 26, 1977, now abandoned, (entitled "Video Disc Transducer System And Method"), and the drawings and written detailed description of said application U.S. Ser. No. 826,054 filed Aug. 26, 1977 is incorporated herein by reference as disclosing further embodiments of the present invention, and as amplifying and clarifying the actually present disclosure.

SUMMARY OF THE INVENTION

This invention relates to a video record for a video transducer system and particularly to a video disc record and to a transducer system and method for transducing video signals recorded on such a disc record.

A disc format is ideal for mass produced video recordings that can be viewed and heard on a home television receiver. The advantages of such a format over tape include (1) rapid reproduction of desired recordings without delays for winding or rewinding between selections; (2) a more compact configuration; (3) a one piece unit construction which is of unique simplicity while yet exhibiting a substantial degree of ruggedness; and (4) reproduction on phonograph type equipment, including record changers, already familiar to consumers.

Video discs have been developed recently using serial recording of video information in the form of very fine modulated spots on a plastic disc, or as mechanically modulated grooves. Video contains so much information per second that such discs must run at high speeds such as 1800 revolutions per minute, and must have very fine tracks, for example 3000 or more grooves per inch. These requirements demand such high precision and such sophistication in the record itself, in the player, and in the duplicator, that the problems have not been solved, especially if the units are to be reliable and inexpensive.

It is an object of the present invention to provide a video disc system which avoids these limitations and is instead reproduced at a very low rate of rotation, for example that corresponding to scanning of one lineal inch of the recorded track per second.

In a preferred embodiment the disc record may comprise a eight or ten inch diameter disc with a succession of recorded images arranged along a spiral video record track having a substantial number of convolutions about the central axis, each convolution having a number of recorded images to provide for example thirty image frames per second during reproduction of the disc record while the disc rotates on its central axis at a rate of rotation corresponding to a lineal speed of the order of one inch per second. By way of example, one disc made in accordance with the preferred embodiment had a number of recorded image frames per convolution so as to provide a standard video frame rate when the disc record was rotated at about two revolutions per minute.

Feature of the invention reside for example, in the recording of image fields with a compressed aspect ratio to provide overlapping recorded lines relative to a playback scanner, the use of a helical sound track synchronized with the video record track, the alternative recording of complete frames with overlapping recorded lines, the provision for generating interlaced reproduced fields from such recorded frames, the provision of a simple and economical transducing machine for recording and/or reproducing the record discs, a radially nonsymmetrical disc aperture and a corresponding driving key on the turntable, a convenient control for positioning the transducer device relative to the record disc, an opaque or transparent record disc with recordings on both sides, means for facilitating the loading of discs while providing for accurate engagement of the transducer device with the record disc in operation, and preferred transducer head configurations for maintaining stable coupling with the video record track without detriment thereto.

Other objects, features and advantages of the present invention will be apparent from the following detailed description of the invention taken in conjunction with the accompanying drawings.

BRIEF DESCRIPTION OF THE DRAWINGS

FIG. 1 is a diagrammatic view of a disc record in accordance with the present invention and showing the helical video track and the corresponding helical sound track;

FIG. 1A is a fragmentary diagrammtic view of a portion of the helical video record track of FIG. 1;

FIG. 1B is a fragmentary further enlarged view similar to FIG. 1A but diagrammatically indicating a series of recorded lines in the video record track and the alternative of a helical sound track interlaced with the helical video record track;

FIG. 1C is a view similar to FIG. 1B but indicating complete recorded image frames which may be scanned to produce interlaced fields of a video signal;

FIG. 2 is a somewhat diagrammatic plan view of a disc record transducing machine in accordance with the present invention;

FIG. 3 is a somewhat diagrammatic vertical sectional view showing further details of the machine of FIG. 2;

FIG. 3A is an enlarged partial vertical sectional view showing one preferred arrangement for stable coupling of the video transducer head with a photographic type disc record; and FIG. 3B is a view similar to FIG. 3A, but showing a second preferred coupling arrangement.

DETAILED DESCRIPTION OF THE PREFERRED EMBODIMENT

FIG. 1 illustrates a preferred disc record 10 in accordance with the present invention. The record 10 includes a central axis as indicated at 11 with a series of recorded images recorded along a spiral video record track as indicated at 12. As indicated in FIG. 1A, the recorded images such as 14-1, 14-2, 15-1, 15-2, 16-1 and 16-2 may be arranged sequentially with respect to a direction of movement of the record track as represented by arrow 18.

For the example where the successive recorded images such as 14-1 are recorded by scanning along a scanning line represented at 19, successive lines may be recorded as indicated at 21-1, 21-3, 21-5, . . . , 21-523, 21-525 in FIG. 1B and the individual recorded images such as 14-1 may represent sub-frames corresponding to a field of a video signal recorded on the disc. In this case, the next sub-frame 14-2 will contain lines 21-2, 21-4, 21-6, . . . , 21-522, 21-524 representing an interlaced field of the video signal, the subframes 14-1 and 14-2 together representing a recorded image frame corresponding to a frame of the video signal and to a single visual image.

With the arrangement illustrated in FIG. 1B, the direction of scanning represented by arrow 19 is transverse to the direction of record track movement represented by arrow 18, and the transverse direction with respect to each recorded image is the direction of maximum resolution, while the resolution between successive lines such as 21-1 and 21-3 corresponds to one-half of such maximum resolution, assuming the horizontal and vertical resolution of the video signal to be the same.

In each of the embodiments herein it is preferred that each recorded image such as 14-1 comprise an ordered plural dimensional spacial distribution of recorded image elements corresponding to respective ones of a plural dimensional array of elemental regions of a plural dimensional visual image. The image elements for example to two successive recorded images such as 14-1 and 14-2 correspond to a single visual image to provide a recorded image frame. The spiral video record track moves at a low speed during recording so that the record track will have a number N of recorded image frames per lineal inch therealong where N is a number substantially greater than one, such as thirty. The image elements of successive recorded images preferably present a time sequence of said recorded image frames with a time span of T seconds per inch of the spiral video record track 12 such as to provide a reproduction frame rate N/T of substantially thirty frames per second with the disc rotating at a rate corresponding to a lineal speed in the direction of arrow 18 of the order of one inch per second.

As a specific example, the spiral video record track 12 may comprise a substantial number of convolutions or track sections such as indicated at 12-1, 12-2, . . . , 12-24, 12-25 encircling the central axis 11 with a density of twenty-five such convolutions per radial inch. If, for example, a center to center spacing between convolutions of about one millimeter (0.040 inch) is used, then three inches of record width would provide about seventy-five convolutions. If each convolution is about twenty-five inches long, and if relative movement in the direction of arrow 18 takes place at a linear speed of about one inch per second, then each convolution such as 12-1 gives a playing time of about twenty-five seconds, and seventy-five convolutions gives more than one-half hour of recording.

By way of example, the disc record 10 may have a silver emulsion layer with a succession of photographic or other images arranged along the spiral video record track 12. Common photographic emulsions are capable of two-hundred line pairs per millimeter resolution (usually referred to as 200 lines/mm) so that acceptable television quality is obtainable with a picture width of about one millimeter. Packing density can be increased by the use of finer grain media. Sensitivity is not too important once the master record is made, since duplication by printing need not have any relation to real time.

It has been found that most photographic emulsions used for picture taking are either coarse grained or of high contrast. A satisfactory film for preliminary work has been a fine grain positive film, Eastman Kodak type 7302, designed for printing from negatives but not recommended by the manufacturer for original photography. Special fine grained emulsions with resolution up to 2000 lines per millimeter are available, and for best results a custom made film compromising resolution, speed, and cost would be most suitable for the present preferred embodiment. Photo-sensitive materials not involving silver are practical, since slowness is not a criterion in duplicate prints. Alternatively mechanically formed images as by pressing or embossing may be used.

Preferably, referring to the illustrated embodiment, the recorded horizontal lines such as indicated at 21-1 and 21-3 are directly adjacent to one another on the disc 10 to form an essentially continuous image with respect to the direction 18 as well as with respect to the line scanning direction 19 (shown as radial to the disc central axis 11). By an essentially continuous image is meant an image such that if upon playback there is an error of scanning alignment or tilt, a continuous output is produced nevertheless by means of a line scanning type playback device. To accomplish this, the picture fields are compressed with respect to the direction of lesser resolution, corresponding to the direction of arrow 18 in the illustrated embodiment, to one-half or less of the usual proportion relative to the line scanning direction. (The non-compressed normal aspect ratio would give a blank space between lines requiring careful scan alignment unless the lines were merged by a blurring of the picture resolution).

Only horizontal line deflection is required for a line type playback scanner since the disc may be rotated slowly about its central axis 11 to provide the relative tangential movement represented by the directional arrow 18. The transverse scanning line diagrammatically indicated at 19 in FIG. 2 may represent the coupling of a transducer device 20 with the video track 12. The light variations resulting from the cyclical scanning along line 19 may be picked-up by a photosensitive cell such as indicated at 22 in FIGS. 2 and 3 which may be a photomultiplier or a solid state device. The output after suitable amplification and equalization is a video signal that may be coupled into the video circuits of a television receiver of the standard NTSC type, or the reproduced video signal may be used to modulate a radio frequency carrier that is coupled to the antenna circuit of the television receiver, the carrier frequency preferably corresponding to a frequency not used by the local broadcast television stations.

A spiral sound track 25 may be located radially inwardly of the video record track 12 and is conveniently produced by the same process as the picture recording. Thus, for example, the sound track 25 may be an optical sound track or a mechanical track which can be pressed or embossed along with the picture recording. A magnetic sound track, however, has been found to have the highest resolution with freedom from noise and distortion when the scanning is at low speeds (such as one inch per second), and for this reason, a magnetic sound track 25 is preferred for the illustrated embodiment where the disc 10 is to rotate at a rate of the order of two revolutions per minute, for example 2.4 revolutions per minute.

Further understanding of the construction of the preferred video record of FIG. 1 may be obtained from a consideration of the recording apparatus illustrated in FIGS. 2 and 3. For this example, record 10 is shown as being provided with a central aperture 10a with a driving notch 10b for receiving a driving hub 30 having a substantially cylindrical portion 30a of an outside diameter corresponding to the inside diameter of the aperture 10a. The hub is provided with a rounded or dome shaped upper face 30b for conveniently guiding the record 10 into engagement with the hub 30. Surrounding the hub 30 is an annular record support 31 having an upper annular surface 31a for flat-wise supporting engagement with an inner annular portion 10c of the record 10.

In the illustrated embodiment, the record 10 may be of relatively flexible material, and the diameter of the support 31 is sufficient to support the over-hanging annular portion of the record indicated at 10d in a relatively planar configuration as seen at the right in FIG. 3. For the illustrated embodiment, support 31 is integral with hub 30, and these parts together form a turntable generally designated by reference numeral 32 and including a central shaft 33 which mounts the turntable for rotation on its vertical central axis.

For the sake of illustration of a preferred arrangement, turntable 32 is shown as being mounted on a carriage 35, and the carriage is mounted by means of guide rollers 36–39 for displacement in a generally radial direction relative to the axis of the turntable so as to provide the pitch shown in FIG. 1 for the successive convolutions 12-1, 12-2, ..., 12-24, 12-25, FIG. 1, of the spiral video record track 12 and such as shown at 25-1, 25-2, ..., 25-24, 25-25 of the spiral sound track 25.

Referring to FIG. 2, a motor is indicated at 40 having an output shaft 41 for driving engagement with the periphery of a drive roll 42. If a single drive roll as 42 is used, the motor 40 should turn at about 60 RPM (revolutions per minute) which may be done by internal gearing. If an 1800 RPM motor is used, two sets of friction rolls in tandem can give the desired speed reduction. By way of example, the drive roll 42 may be in driving engagement with the cylindrical periheral face 31b of support element 31 of turntable 32 so as to turn the turntable about its central axis. The motor 40 may be secured to carriage 35 for movement therewith while maintaining the drive coupling from motor shaft 41 to the periphery of drive roll 42 and from the periphery of drive roll 42 to the peripheral face 31b of turntable 32. The hub 30 of turntable 32 may include a drive key 44 engaging in the notch 10b so as to establish a precise angular relationship between the record 10 and the turntable 32 and to insure rotation of the record 10 with the turntable without any slippage. In the preferred embodiment this driving key 44 is arranged to be radially nonsymmetrical as shown in FIG. 2 such that the record 10 can only be placed on the turntable 32 with a predetermined sideup; that is, the record cannot be placed on the turntable in its inverted orientation. Alternatively the turntable may be driven at a synchronous speed by positive gearing to the motor, or by a servo clutch or brake.

In the embodiment illustrated in FIG. 2, rollers 36 and 37 are constrained for movement along respective guideways 47 and 48, and rollers 38 and 39 are constrained for horizontal movement along respective guideways 49 and 50.

The means for driving the carriage 35 in a linear direction as determined by the guideways 47-50 is indicated as comprising gear teeth 55, FIG. 3, on turntable shaft 33, which are in meshing relation with a gear 56, FIG. 2, on a threaded shaft indicated at 57. The shaft is rotatably mounted in suitable journals 58 and 59 secured to carriage 35. A cooperating half-nut 60 is shown as being carried on an arm 61 which is pivotally mounted to frame 63 at 64. A spring is indicated at 66 for urging the nut 60 upwardly into interengagement with the threaded portion of shaft 57. With the nut 60 interengaged with the threaded portion of shaft 57, during rotation of turntable 32, the threaded shaft 57 is rotated in a direction such as to move the carriage 35 from right to left as viewed in FIGS. 2 and 3. By way of example, an operating button is indicated at 70 in FIGS. 2 and 3 which is reciprocably carried on the carriage 35 and includes a depending leg 70a whose lower end rides along the mounting arm 61. Thus, at any longitudinal position of the carriage 35, the operating button 70 may be depressed against the action of spring 66 to disengage nut 60 from the threaded portion of shaft 57, whereupon by moving the button 70 to the right, while maintaining it depressed, the carriage 35 and associated parts may be returned to their initial rightmost position or to any other position for selecting a desired part of the record.

As indicated in FIG. 2, the carriage 35 may carry a pointer 80, and frame 63 may be provided with a cooperating scale 81 so as to represent the longitudinal position of carriage 35 and thus the relative elapsed time of a transducing operation.

In the illustrated embodiment, the transducer device 20 includes a video transducer unit 85 which cooperates with photocell 22 during playback operation, and the transducer device 20 also includes a sound transducer unit 86.

Recordings may be made with the apparatus of FIGS. 2 and 3 in which case disc 10 may be made of Ektapan or fine grain 7302 film (obtained from Eastman Kodak). The turntable 32 may be rotated by means of drive motor 40 at a constant speed of approximately two revolutions per minute. The video transducer unit 85 may include a cathode ray tube (CRT) 90 which is cyclically scanned along a vertical scan line on the face of tube 90 so as to produce a scanning beam as indicated at 91 which is directed toward the outer periphery of disc 10 by means of a mirror 92 and a lens system 93. The arrangement is preferably such that the beam scans along the scanning line such as indicated at 19 which is disposed generally radially relative to the record 10, the disc rotating slowly in the direction of arrow 95, and the carriage 35 being driven along a linear path in the direction of arrow 96 so that the transducer device 85 scans the record along the spiral video record track 12, and the sound transducer unit 86 simultaneously scans along the spiral sound track 25.

For the case of recording a conventional demodulated broadcast television signal, the beam of the cathode ray tube 90 is deflected in synchronism with the horizontal sync rate of the video signal such that the beam traces substantially sixty interlaced fields per second along the video record track 12. If the lines recorded on the record 10 have a generally radial extent of one millimeter, and if the record track section moves at one inch per second, then one recorded field or recorded image such as indicated at 14-1 in FIG. 1B may have an extent in the tangential direction as represented by arrow 18 of 0.42 millimeter. This approximates a tangential extent of 0.375 millimeter which corresponds to a recorded aspect ratio of eight to three, rather than the normal television display aspect ratio of four to three. By compressing the recorded fields with respect to the tangential direction, the recorded lines essentially overlap such that during playback the proper signal amplitude is maintained even if scanning during playback takes place between recorded lines or in a slightly skewed direction relative to the recording direction. On a simple recorder where the rate of rotation (RPM) of the turntable 32 is constant, the tangential extent of recorded fields varies with the radius of the track; accordingly the value of such constant rate of rotation is chosen to give a good compromise of compression and picture sharpness.

Having produced a master record with a spiral video record track 12 and with the compressed recorded aspect ratio as here described, further records, may, of course, be produced by conventional photographic printing operations, for example, or by magnetic contact printing for magnetically recorded images, so that the reference numeral 10 may designate both an initially produced master record as produced by the apparatus of FIGS. 2 and 3, and subsequent prints produced from such a master record. An oversized master record and a reduction printer may be used for high resolution images.

As an alternative, the record may comprise complete recorded frames as indicated in FIG. 1C such as would be produced by scanning a single visual image with five-hundred and twenty-five sequential horizontal lines from top to bottom of the scene, for example; the corresponding recorded lines one through five-hundred and twenty-five being designated in FIG. 1C as 97-1, 97-2, 97-3, 97-4, 97-5, . . . , 97-524, 97-525. Where such complete frames are recorded with the apparatus of FIGS. 2 and 3, duplicate records may again be made by photographic printing operations or magnetic contact printing in which case successive recorded images such as indicated at 97 and 98 would each comprise a complete frame, and the number of such complete frames per lineal inch in the tangential direction of record track movement as represented by arrow 18 would be such as to reproduce thirty such complete frames per second having a 4 to 3 aspect ratio, for example.

For the case of playback of complete recorded image frames, the playback device 85 may take a form such as to produce interlaced reproduced fields from each recorded image frame. With this mode of operation, the beam of the cathode ray tube 90 (which is rotated ninety degrees compared to a normal picture tube) may be deflected horizontally as well as vertically, the vertical scans as viewed in FIG. 3 taking place at the horizontal line rate, and the horizontal deflection being controlled to scan interlaced fields with respect to each recorded frame. For example, if in a central position of the beam of the cathode ray tube 90, the beam scans along a radial line such as indicated at Y—Y relative to a spiral video record track 100, then the beam may first scan the odd numbered lines of the frame 97 beginning at line 97-1 as shown in FIG. 1C and continuing with the scanning of lines 97-3, 97-5, . . . , the scanning line 19 defined by the beam progressively moving from the plane Y—Y to the plane Z—Z as indicated in FIG. 1C, so that the beam scans the recorded line 97-525 as this line coincides with the plane Z—Z. Then, the beam is shifted to scan along a scanning line coincident with the plane X—X of FIG. 1C at a time when recorded line 97-2 is coincident with this plane X—X. The scanning beam then progresses from the plane X—X to the plane Y—Y scanning the even numbered recorded lines of frame 97 beginning with recorded line 97-2, then recorded line 97-4, and continuing to recorded line 97-524 which at the time of its scanning is substantially coincident with the plane Y—Y. The cycle then repeats with the scanning of recorded line 98-1 of frame 98 (this instant being represented in FIG. 1C) while this recorded line is coincident with the plane Y—Y, the beam moving from plane Y—Y to plane Z—Z in one sixtieth of a second, then rapidly moving to the plane X—X and scanning from the plane X—X to the plane Y—Y in the next one-sixtieth of a second. During the first one-sixtieth of a second, the recorded line 98-1 of frame 98 moves from the plane Y—Y to the plane X—X, and in the second field interval of one-sixtieth second, the recorded line 98-525 moves from the plane Z—Z to the plane Y—Y. It will be apparent therefore that the tangential distance between planes X—X and Z—Z should correspond to the maximum tangential extent of one recorded frame on the record track 100, if the vertical sync between frames is to be reproduced.

For the example of a one millimeter width record track 100, and a speed of the record track section of slightly under one inch per second (i.e. 0.89 inch per second,) the tangential extent of a recorded frame such as 97 may be 0.75 millimeter so that the recorded line density with respect to the tangential direction is the same as for the example of FIG. 1B. The showing of lines in FIGS. 1B and 1C is, of course, entirely diagrammatic since it would not serve a useful purpose to attempt to illustrate all five-hundred and twenty-five lines in these drawings. In FIG. 1C, the scanning planes XX and ZZ are shown not quite parallel to plane YY, to conform with the radial direction of the recorded lines at these locations, but for a recorded frame having dimensions of one millimeter radially and less than one millimeter tangentially, the error due to curvature of the track is very small, and the beam may scan at XX and ZZ in planes parallel to plane YY without introducing any appreciable distortion in the reproduced picture. On the other hand the mirror 92 may present the optical configuration necessary to cause the scanning line 19 to remain in a radial plane as it shifts from YY to ZZ and from XX to YY, to any desired degree of accuracy.

For the case where a magnetic transducer head 110, FIG. 2, is utilized for recording the sound track 25, such head may have confronting poles defining a longitudinal gap 110a having a width in the radial direction of the record of somewhat less than one millimeter for example one-half millimeter. The pitch of the sound track convolutions preferably conforms with that of the video track, and may be twenty-five convolutions per inch, for example. The transducer device 20, FIG. 2, may mount the sound transducer gap 110a at a fixed distance such as indicated at 112 from the video scan line 19, so that each convolution of the sound track such as indicated at 25-1 in FIG. 2 is spaced a constant distance from the corresponding video track convolution or section such as indicated at 12-1. Further, it will be understood that a given segment of the video track such as that subtending the angle alpha in FIG. 2 has a portion of a video signal recorded thereon corresponding to the sound recorded on the sound track portion subtended by the same angle.

Where the magnetic transducer head 110 of the sound transducer unit 86 is utilized, the central annular portion 10c of the record 10 will have a magnetizable layer on its surface as indicated at 115. The layer 115 may be in the form of a smaller disc adhered to the picture disc during manufacture, or as indicated may comprise a magnetic coated area of the picture disc. As an alternative, the sound may be recorded on narrow tracks of magnetizable material interleaved with the picture tracks 12, such as indicated at 116 in FIG. 1B and at 117 in FIG. 1C, for example.

The sound transducer 86 may include a light source as indicated at 120 and a lens and photocell assembly 121 so that the unit of FIGS. 2 and 3 is also operative for playing optical sound tracks. The optical track may be produced by optical recording at the same time that the picture signal is recorded along the video track 12, or the optical sound track may be printed by photographic methods simultaneously with the printing of the photographic type video track 12. The optical sound track may be of the variable area type where the radial extent of the track recorded area is modulated in accordance with the sound signal at the central area 10c of the disc, or the optical sound track may be interleaved with the picture track at regions such as indicated at 116 and 117 in FIGS. 1B and 1C.

Similarly for the case of an embossed or cut mechanical sound track, the sound transducer unit 86 may include a phono stylus pick-up with the phono pick-up cooperating with a helical groove in the central region 10c of the record having the same pitch as the video record track 12. The phono pick-up could be carried in a self-centering groove-seeking mount. Alternatively, the sound groove could be presented in a small channel between convolutions of the video track at locations such as indicated at 116 and 117 in FIGS. 1B and 1C.

Further, of course, the sound may be recorded directly on the video track 12 by any suitable coding or multiplexing technique. Describing the transducer device 20 in further detail, it will be observed that the transducer device includes a mounting arm 130 pivotally secured by means of a hinge 131 to a fixed frame part 132. The pivotal arm 130 is shown as rigidly mounting photocell 22 within a casing 134 and as rigidly carrying the sound transducer unit 86 including the optical sound unit 121 and the magnetic sound unit 110.

A backing element 140 is shown as being secured to the arm 130 at 141. The backing element 140 may be of a resilient metal and may be formed so as to have a free position extending at an angle a few degrees below its active horizontal position shown in FIG. 3. The backing 140 thus forms a cantilever spring for establishing stable pressure engagement between the backing or pressure applying means 140, the overhanging portion 10d of the record and a confronting surface 93a of the lens system 93, so that the scanning line indicated at 19, FIG. 2, will be maintained in accurately focused relation to the underside of the record 10 during operation. When it is desired to change records, the arm 130 is released to pivot about the hinge 131 and thus to lift backing element 140 clear of the record 110 so that the record can be conveniently removed and replaced. Hinge 131 preferably has a coil spring (not shown) associated with its pivot strong enough to lift the arm 130 away from the record against the force of gravity when the arm 130 is released.

It will be apparent that the transducer machine of FIGS. 2 and 3 may form part of a home broadcast television receiver, and be located therewith in a console, for example. In FIG. 3, however, a box-like housing is diagrammatically indicated at 150 having a pivotal cover 151 which may be of transparent material. The cover may be latched in the play position, shown in FIG. 3, and may have secured to it a compression spring as indicated at 153 of greater force than the hinge spring of hinge 131 so that the transducer head 110 is maintained in pressure contact with the record surface 115 until arm 130 is released by unlatching and opening the cover 151. Of course, any other suitable latching mechanism for retaining the parts in the play mode shown in FIG. 3 and releasing them to change records may be provided. The gate element 140 has a window or is of translucent material at the region 140a thereof so as to provide a light path through the gate to the photocell 22.

For the case where the video transducer unit 85 is of the optical type for producing a scanning line as indicated at 19, circuits component 160, FIG. 3 may be coupled with a broadcast television receiver via a line such as 161 for receiving a conventional demodulated composite video signal including horizontal and vertical sync pulses, and this video signal may be supplied to the control electrode of the tube 90 during recording operation to correspondingly modulate the intensity of the light beam produced at the scanning line 19, and thus for exposing the photographic type record 10 in accordance with a video signal to be recorded. At the same time, the sound channel or channels accompanying the video signal may be supplied to the sound transducer unit 86 for recording on one or more spiral sound tracks such as that indicated at 25. During recording operation, the horizontal sync signal of the video signal is supplied to a conventional sync separator and horizontal deflection circuits so as to generate the horizontal rate deflection current for magnetic deflection coils such as diagrammatically indicated at 162 and thus to cyclically deflect the beam along the scanning line 19 at the horizontal line rate of the video signal. The horizontal blanking signal conventionally may be applied to a control electrode where the composite video signal is applied to the cathode in a television receiver set, and this arrangement may be used in FIG. 3. Thus line 163 receives a horizontal blanking signal which is supplied to the control electrode of tube 90 to turn off the beam during its retrace intervals. For example, the circuits of component 160 may include a conventional automatic frequency control circuit so that the phase of the blanking pulses can be selected relative to the horizontal sync pulses of the composite signal. As an example of such adjustment, the blanking pulse to the control electrode and the retrace of the beam as determined by the deflection current to coils such as 162 may lag the horizontal sync pulse of the composite signal supplied to the cathode, so that the horizontal sync pulses and all of the equalizing pulses are recorded on the disc record 10, the sync pulses being recorded at one margin of the video track 12 and the out of phase equalizing pulses being recorded in the middle of the video track 12 as part of the recording of the composite video signal which occurs during the vertical blanking intervals thereof. In this example the vertical blanking signal and the vertical deflection signal normally generated in a television receiver are not generated by the circuit of component 160 during recording of a record as shown in FIG. 1B, so that the equalizing pulses, vertical sync pulse and horizontal sync pulses which occur during each vertical blanking interval will be recorded on the thirteen to twenty-one lines of record track 12 which are scanned by the cathode ray tube 90 during this interval of the composite video signal appearing at the cathode. The brightness adjustment of tube 90 is of course determined so that the amplitude range of the video signal from the white level so that corresponding to the peaks of the sync pulses will all be adequately recorded with sufficient contrast as compared to the unexposed portions of the record track, such that a conventional composite video signal is obtained from photocell 22 by scanning of the record during playback.

In the playback mode, circuits component 160 will operate to supply a constant potential to the control electrode of the tube 90 and only horizontal blanking pulses to the control electrode so that a light beam of constant intensity is scanned along the scanning line 19, FIG. 2 and turned off during retrace intervals at the line rate. The horizontal deflection oscillator of circuits component 160 may be operated at substantially the horizontal sync rate of 15,750 cycles per second so that the proper line rate video signal is supplied from the photocell 22 to the video circuits of component 164 as indicated by line 165. Line 165 may also include a connection with the sound transducers 110 and 121 for supplying reproduced sound to component 164. During playback, motor 40 may be operated at the same constant speed as during recording, so that the reproduced frame rate is essentially thirty frames per second over the entire video record track 12. If desired, horizontal and/or vertical sync marks may be recorded or printed on the record 10 on an optical track such as indicated at 170 in FIG. 2, and the reproduced, horizontal rate sync marks of track 170 may be supplied by the optical pick-up 121 so as to provide synchronizing pulses for insuring that the scanning of tube 90 will be precisely related to the recorded images of the video track 12. It is preferable however, to have the vertical sync signal derived from the picture scan and this may be conveniently picked up when the beam scans the vertical sync pulses recorded between fields of the picture. The vertical beam is not blanked out between fields when CRT 90 scans only horizontally. The vertical sync is separated from the picture info and used for control or sync purposes instead of vertical pulses from track 170. Similarly horizontal sync information may be recorded at the right hand edge of the picture at the finish of each horizontal scan just before the beam is blanked out for the return sweep. The reproduced video signal from photocell 22, the reproduced sound signal or signals from magnetic transducer 110 and the horizontal rate, and/or field or frame rate signal from optical pick-up 22 or 121 may be supplied to the component 164 for construction of a conventional television type signal meeting NTSC standards. The composite video signal may then be supplied to the RF circuits component 172 so as to modulate the radio frequency output which is shown as being supplied via a cable 174 and which may be coupled with the antenna circuit of a conventional broadcast television receiver. As previously mentioned, the radio frequency of oscillator component 172 would conform with an unused channel of the receiver, so that the reproduced video and sound signals could be received as modulated RF by the conventional receiver the same as a normal broadcast television signal.

The reproduced signal from photocell 22 including the horizontal and vertical sync signals at component 164 may be supplied to component 160 in the form of a conventional composite video signal via line 176 and there supplied to a sync separator for separating out the horizontal and vertical sync pulses in the conventional manner. The separated horizontal sync pulses may then be used to synchronize the horizontal rate oscillator which controls the horizontal rate deflection current to coils such as 162 and the horizontal rate blanking signal supplied to the control electrode. The separated vertical sync signal is not needed for control of tube 90 but may be compared with the output of a vertical rate reference oscillator of component 160 or other vertical reference source to provide an error signal for servo control of the rate of rotation of turntable 32. The vertical reference oscillator of component 160 may be locked to the sync of a local sync source or to the separated vertical sync of a received commercial broadcast television signal, for example. The turntable speed may be locked to the vertical reference frequency by controlling a servo clutch or brake associated with the turntable 32 to minimize any error in phase between the reproduced vertical sync and the output of the vertical reference oscillator of component 160 or other vertical sync reference signal.

For a simple playback system, according to FIGS. 1A, 1B, 2, 3 and 3A or 3B, the motor 40 is energized to effect rotation at substantially the speed corresponding to the recorded frame rate, the horizontal oscillator of component 160 is operated in a free running mode to cyclically deflect the beam at substantially the correct horizontal line rate, and the reproduced composite signal is supplied via components 164 and 172 and line 174 to the antenna circuit of a conventional broadcast television receiver which is capable of being synchronized with the reproduced video sync signals so as to accurately display the reproduced picture information. The reproduced sync might in this instance remain within plus or minus five percent of the standard recorded sync rates, or within the lock in range of normal television sets.

A lever is indicated at 180 in FIG. 3 connected with the lens subassembly 181 of lens system 93. The subassembly 181 is threaded so that rotation thereof by means of lever 180 provides a fine longitudinal movement for adjustment of lens focus. A knob 182 is accessible externally of case 150 for actuating lever 180 so that focus can be adjusted during operation.

FIG. 3A shows a radial sectional view at the video transducer-disc record coupling region, so as to illustrate a record contacting upper end 203 for the lens system 93 of a first preferred configuration. In this embodiment, the end 203 is provided with a series of elongated ribs 204, 205, 206 and 207 for engaging the emulsion side of a photographic type disc record 10 along narrow arcuate segments of the record 10 which are between the recorded images. For example if the images having a radial center to center spacing of one millimeter, the ribs 204–207 may have a radial center to center spacing of one millimeter and the actual recorded image may have a useful radial extent of slightly less than one millimeter, so that the ribs 204–207 do not contact the useful portion of the recorded images on the record track 12. The ribs 204–207 may thus contact the disc record at marginal portions corresponding to the undersides of respective convolutions of the sound track 116, FIG. 1B, or 117, FIG. 1C. Since the curvature of the successive convolutions varies with their radial distance from axis 11, the ribs 204–207 will be of limited extent in the circumferential direction relative to the record and will have an intermediate curvature such that during their tracking along the margins of the video record track, they will not contact the useful radial extent of the recorded images. Generally, any contact with the actual picture portions of a photographic type disc record 10 is undesirable, and this is especially true of sliding contact. Additional auxiliary ribs may be provided at one millimeter centers so as to distribute the pressure of the end 203 of the lens system on the record 10 to the extent desired. Each of the ribs such as 204–207 may be of arcuate configuration corresponding to the mean curvature of the video record track 12, so as to substantially conform with the arcuate margins or boundaries of the successive convolutions of the video record track over the full extent thereof.

In the embodiment of FIG. 3A, a cantilever spring 140' carries an annular pad 210 of felt or the like. The spring 140' may have the same free configuration as gate element 140 so as to provide a spring bias on the pad 210 when the spring 140' is held in a horizontal orientation. The annular pad 210 may include a thin layer of smooth material with a low coefficient of friction such as Mylar as indicated at 211. The layer 211 may be transparent or may be provided with a central aperture conforming with the aperture 212 in pad 210 and aperture 213 in spring 140', and its undersurface will be in sliding pressure engagement with the upper surface of record disc 10. The aperture 214 in end 203 of the lens system of the video transducer and the aligned apertures such as 212 and 213 in the pressure applying means 140', 210 and 211 provide a light path for light from the cathode ray tube 90 to the photocell 22 during playback operation.

FIG. 3B shows a second preferred embodiment wherein an end 220 of the lens system of the video transducer is provided with a cylindrical wall 221 with a transparent end 222 aligned with opening 223 in end 220 for transmitting light from the cathode ray tube 90 and the lens system to the record 10. A cantilever spring is shown at 140" for applying downward pressure on a pad 224 which engages the upper side of the record 10. The interior wall 220a of end 220 and the cylindrical wall 221 form an air chamber 225. Air is supplied under a regulated pressure to the chamber 225 from an air conduit 226 so as to establish an air stream flowing through aperture 223 and against the underside of disc record 10. The air pressure in chamber 225 is maintained at a value which holds the emulsion side of disc record 10 clear of detrimental contact with the end 220 of the lens system. The air pressure in chamber 225 may be regulated to maintain the scanning beam focused on the underside of disc record 10. An adjustable pressure relief valve and pressure indicator device 227 is shown in FIG. 3B to represent the control of pressure for these purposes. The elements 140", 224 at the back of the disc 10 (the upper side in FIG. 3B) may be omitted since the air flow from opening 223 can be adjusted to maintain focus without a physical backing element on the side opposite the side on which the air stream impinges. Alternatively the pressure in chamber 225 may be below atmosphere pressure to position the record at the optimum focal point.

By way of example, the magnetic transducer head 110 may be of the ring type with confronting pole pieces separated by a gap spacer material which defines the coupling gap 110a. The gap 110a may be disposed in the same radial plane as the scanning line 19 as shown in FIG. 2. The poles of the magnetic transducer head have a width equal to the width of the sound track and may be in pressure engagement with the surface 115 of the magnetizable layer by virtue of the action of spring 153, FIG. 3.

The reading of indicator 227 responds to the air flow through opening 223 and is useful for indicating the distance of film 10 from this opening, especially if the air supply has a high "internal resistance characteristic". Indicator 227 is therefore mounted where it can be read easily, as for example outside of the case. The air supply is preferably filtered and may be generated by a simple pump or blower on the drive motor for the turntable, with an external adjustment as for example a needle value to set the film distance to the desired focal point.

The control of current to deflection coils 191 and 192 to shift the scanning line 19 in the tangential direction from YY to ZZ during odd field intervals is analogous to vertical deflection in a television receiver except that the deflection is one-half what would be required if the record were stationary. Similarly the deflection of the scanning line from XX to YY during even field intervals is closely analogous to conventional vertical deflection in television receivers, and this type of deflection is readily implemented by those skilled in the art. For example, a bistable circuit may respond to vertical sync pulses and supply an additional deflection current to coils 191 and 192 during even field intervals, so that deflection begins at XX rather than at YY during such even field intervals. The vertical blanking signals are generated by the vertical reference oscillator in component 160 in this example and are used to turn off the beam as it retraces from ZZ to XX. The vertical blanking signal may be blocked by the aforementioned bistable circuit between frames so that vertical sync signals are recorded in these intervals. The vertical oscillator may be controlled by the separated vertical sync from the video signal being recorded for recording operation and synchronized as previously explained during playback.

With the embodiment of FIG. 1C, during recording, therefore, the horizontal sync pulses and the equalizing pulses may be recorded on the record track 100 except during retrace from ZZ to XX (which might require fifteen horizontal line intervals per frame, for example). Generally a momentary loss of horizontal sync pulses between interlaced fields and the loss of alternate vertical sync pulses from the reproduced signal would not prevent generation of a complete composite signal at component 164 since the reproduced frame rate vertical sync pulses from the photocell 22 can be separated and compared with the output of the reference oscillator to generate an error signal used to lock the speed of rotation of the turntable 32 to the vertical reference oscillator, and the vertical reference oscillator can control generation of the conventional vertical blanking waveform for the composite video signal to be supplied to component 172. Also the reproduced horizontal sync signals from photocell 22 can be separated and used to control horizontal deflection and sync. The sync generators may for example generate 15750 horizontal deflections per second consisting of 60 sets of 262.5 lines per second, with the standard vertical blanking and sync pulses following each set of 262.5 lines according to the NTSC black and white standard (or slightly modified sets for the NTSC color standard). The record speed may then be adjusted to maintain or lock in its pictures to the vertical sync rate; or alternatively the sync generators may have their frequency modified slightly by a control to keep the vertical sync locked to the frame rate presented by the record. Both the disc speed and the vertical sync rate may be locked to the nominal 60 cycle line frequency so that they remain together, while the horizontal rate is preferably adjusted for 262.5 times the vertical field rate, although it may depart from this rate with some degradation of interlacing.

The output of the horizontal and vertical oscillators of component 160 are thus locked to the phase of the reproduced picture from photocell 22, and these oscillators may thus supply reference signals via line or two-way connection 176 to component 164. Component 164 may then have the usual NTSC camera circuits or the equivalent for generating a complete composite video signal for supply via conductor 177 to component 172.

If a recording is made with the turntable rotating at constant speed, then the aspect ratio of recorded images will vary with the radius of the track section. Preferably at the track section with maximum radius the recorded aspect ratio is eight to three in FIG. 1B and four to three in FIG. 1C so that the recorded lines overlap, having reference to the playback function over the entire extent of the video track 12. While the inner convolutions such as 12-24 and 12-25 of the video track 12 are compressed in the tangential direction compared to outer convolutions such as 12-1 and 12-2, degrading the vertical resolution slightly, the picture shape of the reproduced video track 12 remains constant since playback speed changes with radius the same as recording speed.

Where the transducers 110 and 121 are to be used on the same disc record, the head 121 may be evenly spaced between photocell 22 and transducer 110, and magnetizable layer 115 may be restricted to the area traversed by head 110. Then the tracks 12, 170 and 25 would have each respective convolution thereof equally spaced and the tracks 12, 170 and 25 would be on separate annular regions of the record.

With the configuration shown in FIG. 2, layer 115 is translucent or is limited to a spiral magnetic track which interleaves with the optical track 170; or the light source 120 can be in the infra red spectrum which will readily penetrate unexposed portions of record 10 and the magnetizable layer 115, allowing both optical and magnetic tracks in the same area. Of course transducer 121 could be of the same type as magnetic transducer 110, and record and reproduce vertical and horizontal sync pulses on a separate or interleaved part of layer 115.

The frame rate recorded or printed on the disc record 10 and reproduced therefrom may be selected to meet the requirements of other broadcast television systems such as the European television system, for example.

A record changer may be utilized with the illustrated embodiment to supply a succession of records, for example by automatically removing records by lifting the same axially upwardly to clear hub 30b, the hinged arm 130 being swung out of the way. Afterwards the records may be moved in a horizontal plane as viewed in FIG. 3, a further record being applied to the turntable 32 as the previous record is being removed. The turntable 32 may be of translucent plastic material to allow light passage if the light source 120 and the optical pick-up 121 are utilized.

Where complete frames are printed on the record 10 such as indicated at FIG. 1C, it may be desired to use frames of equal tangential extent over the entire length of the video record track, and utilize frame sync marks along a helical sync track such as indicated at 170 in FIG. 2 to precisely control the initiation of the interlaced scanning operation as represented in FIG. 1C. In producing successive complete frames as shown in FIG. 1C, the frames can be printed from movie film or the like, by focusing the successive frames at successive locations along the video record track 12 by essentially conventional procedures. As just explained, the successive recorded frames may be of equal tangential extent, and may be recorded with rectilinear margins, and with a tangential extent equal to the spacing between the parallel scan lines X—X and Z—Z in FIG. 1C, the lines X—X and Z—Z being practically parallel with the line Y—Y in this example. For the case of complete frames, each frame may have a rectilinear configuration with a generally radial center line dimension corresponding to Y—Y of one millimeter and a tangential extent at right angles to such line Y—Y of three-fourths millimeter to provide the conventional four to three aspect ratio for the recorded frames. A constant track speed may be obtained by servo control of the turntable. Alternatively the tangential extent of each frame may be decreased in proportion to the radius as the tracks spiral inwards.

Instead of recording the images of any of the embodiments on a spiral video track, the successive images may be recorded along successive circular paths with radial shifting from one arcuate path or track to the next at a given point. The transition from one arcuate path to the next may include a substantial tangential component to provide for scanning of recorded images during the transition from one constant radius portion to the next constant radius portion. As a further alternative, a series of circular tracks may be provided. With either alternatives any track may be selected and repeatedly reproduced as long as desired. The frames may represent blocks of data rather than visual images of a pictorial nature. While thirty frames per second conforms with the conventional U.S. broadcast standard, European television uses twenty-five frames per second, and there are other possible standards, for example for high resolution closed circuit televison systems and the like. While a figure of one inch per second has been given as a typical speed along the video track, for the example illustrated, the speed may vary continuously as a function of the radial distance from the axis 11, and the audio transducing speed may be of the order of one-half inch per second and also continuously vary as a function of radial distance from the central axis, where the disc rotates at constant speed during recording operation, for example. Where optical frames are recorded or printed in the record, such frames may be scanned while the disc is stationary, with indexing of the disc to scan successive complete frames, for example (intermittent movement). Alternatively, a shutter, or a synchronized tangential component of movement of the reproducing beam may be provided. A solid state liner scanner may be utilized to scan along the scanning line 19, in place of a cathode ray tube type scanner.

A disc made of color film or color positive paper may be provided with images in their true colors, or with negative color images as on Kodacolor negative. These are played back with a color camera tube or its equivalent. Alternatively a white flying spot scanner is used, and the output light after scanning is viewed by three (for example) photocells each with a filter to make it response to a different primary color.

As a further alternative, the color may be coded onto the black and white picture images by superimposing a horizontal scan modulation with a different (high) frequency fine shading or sectioning of this image for modulating a horizontal scan assigned to each primary color. For example green may have 2.5 megahertz modulation, red may be assigned a 3.5 megahertz rate and blue may be assigned a 3 megahertz rate.

As a third alternate, alternate lines or frames of the picture recorded images may bear the color information. The color line or frame is scanned "silently" (without the resultant electric signal being displayed on the display screen by itself) while a correct image is displayed either from a parallel picture or from a series interposed picture. The series interposed picture uses another simultaneous scanner and a stepping system, or an information storage device which holds and repeats a line or a field (or frame).

As a fourth alternative for color transducing, multiple black and white images can be recorded in parallel, each one with the information of a different color. The radially aligned fields or frames on the record representing the respective colors (3 for example) are scanned simultaneously, and each one picked up by a separate photosensor that activates the corresponding color circuit.

Each of the embodiments given herein is disclosed as using each of the sound track configurations herein disclosed. Contact printing is preferred for producing optical or magnetic sound tracks. A mechanical sound track may be formed by pressing.

A low cost player may project complete recorded image frames such as indicated in FIG. 1C directly on a screen so that a television set and scan converter are unnecessary. A stepping motor drive for the record disc, for example, may provide frame by frame projection. A intermittent drive of this kind may be used in conjunction with a shutter to block out the transition between frames. As a third alternative, an optical rectifier may be utilized with a continuously rotating disc. Still further, the complete recorded frames such as described with respect to FIG. 1C in any of the forms herein given, may be utilized with a light source and lens system for focusing each successive frame on a vidicon or other type of television camera system. With each image focused on the camera, the image can be converted to a video signal with conventional televison techniques; any image device such as plumbicon, image orthicon, or the like may be utilized. Color images and a color camera are usable. If continuous motion of the record is used rather than intermittent motion, the camera tube is scanned along a line in the horizontal direction only, the vertical scan being supplied by motion of the disc, for example; or the directions of scan can be interchanged if the pictures are scanned in a non standard manner as in transverse or tangential direction. If an intermittent drive and shutter are used, then the camera tube can be used with both vertical and horizontal scanning. With a flying spot scanner, both vertical and horizontal scanning is feasible if an intermittent drive is used. The transition intervals can be blanked out.

An opaque disc system may be utilized with video and sound tracks on both sides of the disc, if desired. Any of the configurations described herein can be applied to both of the sides of the disc, to increase the program capacity. An opaque record can be provided with printing processes that are used on paper or the like to provide a low cost record. Solid state linear scanners using integrated circuit techniques can provide very small and very thin lines for direct scanning, or a larger line source can be reduced to the size of the desired frame, with a lens system or fiber optics. Servo or digital systems can be provided for operating a shutter or the equivalent from the frame track such as indicated at 170 or the equivalent. Speed control of the disc is feasible according to the frame rate with the frame signals such as indicaed at 170 having an equal tangential spacing, for example. The disc would then slow down while scanning the outer convolution such as indicated at 12-1 at the outer periphery of the spiral so as to give a constant tangential speed in the direction of arrow 18 over the entire extent of the recorded video track. By using an objective (lens system) having a shallow depth of field, recordings can be used on both sides of a transparent disc without interfering with one another. For example an objective of 8 mm or shorter focal length with a numerical aperture of 0.5 or higher has a depth of focus of a few microns, while a record disc may be 125 microns thick. In this case, if the focus is set for images on the far side of the record (away from the objective) then the near layer will be so far out of focus that it will not register, especially if the spiral tracks correspond with each other (one spiral being played in reverse when the record is turned over). Alternatively the record need not be turned over, but the lens may be changed to focus on whichever recording is desired. Extending this concept, a record with a thick emulsion may have many recorded planes each one selected by refocussing an objective of very shallow depth of field. A record changer thus has to change the focus only and one record can have an album of recordings on it.

Further features of the invention reside in a disc with two related sets of tracks one adjacent the periphery and the other adjacent the inner portion, for simultaneous scanning, apparatus for above, and a disc drive where a substantial portion of the disc periphery overhangs the drive, having part of its recording on the overhanging portion, and a record related part on the inner portion, both being scanned simultaneously, for example.

In each of the embodiments, recording is preferably carried out under darkroom conditions except that a safelight can be used if the films are not sensitive to reds and oranges. A film pack can be used for daylight recordings on a specially designed turntable with a light tight enclosure.

For playback it is sufficient to exclude external light at the photocell, which can be done by a ring of black velvet extending from the lower edge of the photocell housing 134, FIG. 3 and riding against the record. Similarly the lens system 93, FIG. 3, 203, FIG. 3A or 220, FIG. 3B, can be shielded at the record. The path from the cathode ray scan tube 90 to the lens system 93, FIG. 3, is also easily shielded from external light.

EXAMPLE 1

The record is a ten inch diameter disc with an inner hub opening two inches in diameter, driven at two RPM. The picture track is 0.040 inches wide and extends in a ring somewhat less than two inches wide at the record periphery, giving about 45 tracks of ½ minute each, or 22½ minutes total. Each field has a height varying from 0.0175 inches high at the outside track to 0.0105 inches high at the inner track, departing from the optimum of 0.0150 that gives a 8:3 aspect ratio, but with a beam diameter that allows scan overlapping at the outer tracks at a compromise of resolution. The beam is not blanked out during vertical periods (except for horizontal retrace). During recording the horizontal and vertical rates are according to a broadcast picture. During playback the horizontal rate is approximately 15750 cycles. The record has positive images, made by exposing to negative line scans from the flying spot scanner (polarity of signal to its control electrode reversed from that used in picture viewing). Sound is recorded on a magnetic surface of about six inches diameter at the inner periphery, in a spiral of about 45 tracks occupying a ring somewhat less than two inches wide.

The compromises described in this example are done in the interest of simplicity and low cost.

EXAMPLE I A

This example includes all of the parameters of Example I and the following further specifics referencing the preceding description and the drawings.

Recording

1. Record disc 10 of fine grain positive film, Eastman Kodak type 7302.
2. Apparatus of FIGS. 2, 3 and 3A with scanning line 19 focussed on the under surface of the record. Case 150,151 of light-tight construction.
3. A composite video signal is supplied via line 161, the horizontal sync of the input signal providing control of the horizontal oscillator of component 160. The horizontal oscillator controls the blanking signal supplied to conductor 163 and the deflection signal supplied to deflection coils such as 162. Deflection coils 191 and 192 are not energized, and no vertical blanking signal is supplied to the cathode ray tube 90. The video signal supplied to the cathode of tube 90 has the peaks of the sync signals providing maximum beam current, and the peak picture signal providing a lower value of beam current.
4. The motor 40 is energized with its rated voltage at sixty cycles per second from the commercial power line such that the record speed of rotation is substantially constant, for example within plus or minus one percent and well within the lock-in range of the deflection circuits of broadcast television receivers.
5. The phase of the horizontal blanking signal is selected relative to the horizontal sync applied to the cathode of tube 90 such that the horizontal sync is recorded at the right margin of track 12 as viewed in FIG. 1B, just prior to horizontal retrace of the blanked cathode ray tube 90.
6. The 300 line per millimeter resolution of the system including the CRT 162, lenses 93 and material of record disc 10 results in overlapped recorded lines for each successive recorded field over the extent of the video record track (e.f. from a radius of 4.8 inches to a radius of three inches).

Playback

1. Record as produced by the procedure of Example IA and with other conditions as in Example I.
2. Apparatus of FIGS. 2, 3 and 3A, but with a light proof enclosure enclosing the light path 91, mirror 92 and the lower end of the lens system and a fitting at end 203, FIG. 3A, in the form of an annulus closely encircling ribs 204 and 207 and provided with black velvet extending upwardly from end 203 to engage the undersurface of record 10 in all operating positions of the lens system relative to the record. The upper side of cantilever spring 140′ is provided with a ring of soft light blocking material surrounding aperture 213 for engaging light proof casing 134, FIG. 3, and preventing access of external light to the path of light leading to photocell 22, so that the playback light path is shielded from ambient light throughout its length.
3. The motor 40 is energized the same as during recording as given in this Example, i.e. to operate at the same speed as during recording within plus or minus one percent.
4. The horizontal rate oscillator of component 160 is operated at substantially 15,750 cycles per second and is used to produce the line rate deflection signal supplied to deflection coils such as 162 and to control supply of the horiontal blanking signal to line 163. The phase of the blanking signal is adjusted such that each recorded horizontal sync pulse is reproduced at photocell 22 as is each vertical blanking interval waveform.
5. The reproduced video signal from photocell 22 including the reproduced horizontal and vertical sync signals conforms to the composite video signal as recorded, and any variation in sync rate is within the tolerance limits of conventional broadcast television receivers.
6. The beam diameter at the record during playback may be 100 microinches or greater (where the interval of one line corresponds to a maximum distance of 0.0350/525 or about 67 microinches), but is not critical because of the relatively low resolution of the overall system. The gradual change of vertical sync timing (if any) because of this relatively low system resolution, change of recorded field size along the track and overlap during playback does not prevent the television set coupled to line 174 from producing a stable picture, although the verticl extent of the displayed picture may resolve fewer lines of the video signal.

EXAMPLE IB

This Example is the same as Example IA except that the overall system provides a resolution of 10,000 line pairs per inch, the recorded lines having a maximum separation (unrecorded space) of fifty microinches between lines and the playback beam at scanning line 19 having a diameter of 67 microinches so that the recorded lines will always be in overlapping relation relative to the playback beam diameter. Again any gradual change of vertical sync timing of the reproduced video signal will not interfere with picture stability.

EXAMPLE II

Same as Example I with the following changes. The turntable is servo controlled and locked to the vertical sync circuits to give a constant tangential velocity of 0.9 inch per second, maintaining the 8:3 aspect ratio of each field. The tracks are separated by a ten mil space (index distance about fifty mils per revolution of the disc. In the space between tracks a phonograph type sound track is pressed, which is followed during playback by a stylus in a phono cartridge mounted with a limited side-play adjacent the photocell to allow the stylus to rest freely in the proper groove. The interleaved picture and sound grooves extend inwards to about a three inch diameter. The playback sync and deflection include an accurately controlled 15,734.264 cycle per second horizontal generator (NTSC color standard) with the vertical generator locked to the horizontal to give 262.5 lines per field, i.e. to give a field scanning frequency of 59.94 cycles per second.

This system, while more elaborate than in example I, gives better picture quality and longer recording time. The recording time can be increased further by reducing the space between picture tracks.

EXAMPLE IIA

This example includes all of the parameters of Example II and the following further specifics referencing the preceding description.

Recording

1. Record disc 10 together with CRT 90, lens system 85 and material 93, have an overall resolution of 400 line pair per millimeter.
2. Apparatus of FIGS. 2, 3 and 3A with scanning line 19 focussed on the under surface of the record. Case 150,151 of light-tight construction.
3. Same as item 3 (Recording) in Example IA. The horizontal sync of the signal being recorded would normally be at a frequency of 15734.264 CPS.
4. The speed of rotation of turntable 32 is servo controlled and locked to the vertical sync of the video signal supplied at line 161, so that each track section of track 12 is recorded with a tangential velocity of about fifteen mils per vertical sync period or about 900 mils per second (more precisely 0.9 inch per second).
5. The reproduced video signal from photocell 22 including the reproduced horizontal and vertical sync signals conforms to the composite video signal as recorded, and any variation in sync rate is within the tolerance limits of conventional broadcast television receivers.
6. The recorded lines are produced by recording light spot of about fifty microinch diameter so that the recorded lines overlap relative to any playback light spot of practical size transverse to the scanning line 19.

Playback

1. Record disc as produced by the procedure of Example IIA and with other conditions as in Example II.
2. Apparatus of FIGS. 2, 3 and 3A, but with a light proof enclosure enclosing the light path 91, mirror 92 and the lower end of the lens system and a fitting at end 203, FIG. 3A, in the form of an annulus closely encircling ribs 204 and 207 and provided with black velvet extending upwardly from end 203 to engage the undersurface of record 10 in all operating positions of the lens system relative to the record. The upper side of cantilever spring 140' is provided with a ring of soft light blocking material surrounding aperture 213 for engaging light proof casing 134, FIG. 3, and preventing access of external light to the path of light leading to photocell 22, so that the playback light path is shielded from ambient light throughout its length.
3. The component 160 includes an accurate crystal controlled horizontal line rate oscillator operating at the NTCS color standard line rate and a vertical field rate generator locked (by a digital divider circuit) to the horizontal line rate oscillaor to supply a field rate signal for every 262.5 line rate pulses. The speed of rotation of the turntable is servo controlled and locked to the output of the vertical field rate generator so that the video track 12 is traversed with a uniform tangential velocity of about fifteen mils per vertical field period (specifically 0.9 inch per second).
4. The accurate horizontal line rate oscillator controls deflection and blanking at tube 90. The recorded horizontal and vertical sync is reproduced at photocell 22.
5. The reproduced composite video signal from photocell 22 conforms to the video signal as recorded with the reproduced line rate conforming to the NTSC color standard, and preferably the horizontal sync pulses are accurately derived from the standard oscillator.
6. The beam diameter during playback may be of any convenient size consistent with the desired system resolution.

EXAMPLE III

Same as example I except that a six inch disc is used, and the record turns at 3.33 RPM. With a spiral of fifteen tracks a playing time of about five minutes is obtained in a ring less than an inch wide. The track pitch is 0.062 inches, with pictures 0.040 inch wide. A variable area photographic track is located in the space between picture tracks. The picture master is negative, from a flying spot line scanner modulated by a signal of polarity normally used for viewing. The copies are positive contact prints made from the negative. The interval between picture fields is blanked out during recording giving a black area separating the fields on the print for triggering the vertical sync during playback. This small record is useful for popular programs and for educational items.

EXAMPLE IV

Similar to example II but with a twelve inch diameter disc and enlarged images 0.08 inches wide and a constant tangential velocity of 1.8 inches per second, giving a higher quality image of eight to ten minutes duration, with color capacity.

EXAMPLE V

Similar to example II except that the images are originally on motion picture film which are reduction printed, frame by frame on to the disc. There are thirty complete frames per 0.9 inch tangential distance, instead of sixty fields of example II in the same distance, and the frames have an aspect ratio of 4:3 instead of 8:3 for the fields. Playback is by means of the scanner described for FIG. 1C which gives an output of sixty interlaced fields per second.

It will be apparent that many further modifications and variations may be effected without departing from the scope of the concepts and teachings of the present invention. The various alternatives and modifications expressly referred to are each specifically disclosed as being utilized with each of the illustrated embodiments to the extent compatible therewith. As an example, for accuracy the disc 10 can have a rigid backing of glass. In case of an opaque record, the backing can have the same configuration as record 10 and be of metal, for example, the metal being at the top side of the record for a recording mechanism as in FIGS. 2 and 3, and playback being of reflected light. In this case a reflex mirror could be included in the upper chamber of lens system 93 to gather the light reflected from the record surface and direct it to a local photocell in 93. Alternatively an opening could be bored in the upper or lower part of lens support 93 and a tiny photocell inserted, with its sensitive surface interrupting light reflected from the disc but with the cell not obstructing the main scanning beam.

I claim as my invention:

1. A transducer system for transducing video signals, comprising:
    (a) a disc record support with a central axis for mounting a disc record thereon for rotation about said central axis during a video signal transducing operation, said disc record support having an annular region surrounding said support and receiving an annular portion of a disc record which extends beyond said disc record support, (b) a transducer device having an optical path disposed in alignment with said annular region, and a scanner operating at a video rate and coupled with said optical path for scanning successive optical images on an annular portion of a disc record which extends beyond said disc record support, (c) said transducer device having record guiding means disposed at said annular region and guiding a radially outer portion of a disc record as it is rotated about said central axis at a frame transducing speed less than that required for a substantial air bearing effect and at said frame transducing speed maintaining substantially a predetermined positional relationship of such radially outer portion of said disc record relative to the optical path of said transducer device, and (d) means comprising a drive for rotating said disc record at a rate such that the scanner scans a series of optical images along an annular portion of a disc record during each revolution of the disc record at said frame transducing speed with said record guiding means maintaining said predetermined positional relationship between the disc record and the transducer device throughout each revolution of said disc record to insure a stable scanning of the disc record by means of said transducer device, (e) said record guiding means comprising a gate region providing a plurality of generally parallel elongated ribs spaced apart so as to engage the disc record along narrow segments thereof at opposite margins of the optical images on the annular portion of the disc record with the ribs extending generally in a circumferential direction relative to the disc record and being located at one side of the disc record, and active positioning means acting on the disc record in said annular region during a scanning operation and producing a biasing force biasing the disc record into continuous contacting engagement with said elongated ribs to precisely locate said annular portion of the disc record without any physical contact with the optical images, and means comprising said transducer device for scanning successive optical images on the annular portion of the disc record which is between the elongated ribs without any physical contact with such optical images, and (f) a disc record having a central portion supported by said disc record support, and having an annular portion extending beyond said disc record support, said annular portion of said disc record having a contact-sensitive image storage means at one side thereof providing an arcuate image track with a circumferentially extending arcuate central image track portion for storing a series of optical images therealong, said arcuate image track having narrow arcuate segments at opposite margins of said circumferentially extending arcuate central image track portion, (g) said record guiding means and said active positioning means being the sole means which engage with the annular portion of said disc record, and being constructed to engage the contact sensitive image storage means exclusively at said narrow arcuate segments of said arcuate image track and to be entirely clear of contact with said contact sensitive image storage means at said circumferentially extending central image track portion which stores said series of optical images.

2. A transducer system according to claim 1 with a disc record having a central portion supported by said disc record support, and having an annular portion radially outwardly of said central portion and extending beyond said disc record support, said annular portion of said disc record being formed of a photographic film substrate with a photographic emulsion forming a surface layer thereon and having a series of optical images developed therein for scanning during one revolution of the disc record, and being disposed with its photographic emulsion surface layer in operative relation to said record guiding means and in alignment with the optical path of said transducer device such that the scanner scans said series of optical images along said annular portion of said disc record and between said elongated ribs during one revolution thereof, said active positioning means comprising a backing element engaging the photographic film substrate and acting on the side of the disc record opposite said photographic emulsion surface layer so as to be clear of physical contact with the photographic emulsion surface layer.

3. A transducer system according to claim 2 with said disc record consisting essentially of a unitary translucent photographic film material comprised of said film substrate and said photographic emulsion surface layer, said transducer device defining an optical path which extends between said elongated ribs, through said disc record and through said active positioning means.

4. A transducer system according to claim 2 with said disc record having respective series of optical images along respective arcuate tracks on said annular portion for passage between said ribs, and said transducer device generating a video signal with a line rate of substantially 15,750 lines per second in accordance with each of said series of images in succession.

5. A transducer system according to claim 1 with said scanner projecting a cyclically deflecting beam along said optical path and focused at a focal plane in said annular region between said elongated ribs such that the beam moves along a line scanning direction in said focal plane, and said record guiding means being operative to maintain an annular portion of the record substantially at the focal plane of said beam.

6. A transducer system according to claim 1 with a disc record on said disc record support having optical images on an outer annular portion thereof, with generally rectangular configuration and with a width dimension of the optical images directed generally radially of the annular portion of said disc record for scanning by the scanner in one video line interval, each optical image on the disc record corresponding to a visual image with a width to height ratio of substantially four to three, the height dimension of the optical images in the circumferential direction of the annular portion being compressed such that the width to height ratio of each optical image is eight to three, a pair of optical images corresponding to each complete visual image, and the scanner operating at a field rate of sixty cycles per second to scan sixty optical images per second as the disc record is rotated at said frame transducing speed.

7. A transducer system according to claim 1 with said transducer device including a sound transducer head disposed in association with the disc record support for scanning of an arcuate sound track on an inner annular portion of a disc record overlying said disc record support, and a disc record having a central portion supported by said disc record support, and having an annular portion radially outwardly of said central portion and extending beyond said disc record support, said annular portion of said disc record having a series of optical images therealong for scanning during one revolution of the disc record, and being disposed in operative relation to said record guiding means and in alignment with the optical path of said transducer device such that the scanner scans said series of optical images along said annular portion of said disc record between said elongated ribs during one revolution thereof, said disc record being free of said disc record support at said annular portion thereof and having said optical path extending radially outwardly of said disc record support between said elongated ribs and through said annular portion of the disc record, the annular portion of the disc record being flexible and being deflectable relative to said disc record support by the action of said record guiding means, and the sound transducer head acting on said central portion of the said central portion of said disc record where supported by said disc record support against any substantial deflection.

* * * * *